us011154947B2

(12) United States Patent
Matsudaira et al.

(10) Patent No.: US 11,154,947 B2
(45) Date of Patent: Oct. 26, 2021

(54) LASER PROCESSING SYSTEM

(71) Applicant: Fanuc Corporation, Yamanashi (JP)

(72) Inventors: Tetsuro Matsudaira, Yamanashi (JP);
Masatoshi Hiramoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 203 days.

(21) Appl. No.: 16/445,576

(22) Filed: Jun. 19, 2019

(65) Prior Publication Data
US 2020/0001394 A1 Jan. 2, 2020

(30) Foreign Application Priority Data

Jun. 28, 2018 (JP) .............................. JP2018-122968
Apr. 24, 2019 (JP) .............................. JP2019-083080

(51) Int. Cl.
*B23K 26/08* (2014.01)
*B23K 26/042* (2014.01)
*B23K 26/082* (2014.01)
*B25J 9/16* (2006.01)

(52) U.S. Cl.
CPC .......... *B23K 26/042* (2015.10); *B23K 26/082* (2015.10); *B23K 26/0884* (2013.01); *B25J 9/1651* (2013.01)

(58) Field of Classification Search
CPC . B23K 26/082; B23K 26/042; B23K 26/0884
See application file for complete search history.

(56) References Cited

U.S. PATENT DOCUMENTS

| 7,291,606 | B2 | 11/2007 | Takahashi et al. | |
|---|---|---|---|---|
| 8,412,371 | B2 | 4/2013 | Komatsu | |
| 8,742,290 | B2 | 6/2014 | Oe et al. | |
| 2012/0255938 | A1* | 10/2012 | Oe ....................... | B23K 26/082 |
| | | | | 219/124.22 |

FOREIGN PATENT DOCUMENTS

| JP | 2007030031 A | 2/2007 |
|---|---|---|
| JP | 2007098416 A | 4/2007 |
| JP | 2009214174 A | 9/2009 |
| JP | 2012139711 A | 7/2012 |
| JP | 2012218029 A | 11/2012 |
| JP | 2018-039039 A | 3/2018 |
| WO | 2017051504 A1 | 3/2017 |

* cited by examiner

*Primary Examiner* — Robert J Utama
*Assistant Examiner* — Lawrence H Samuels
(74) *Attorney, Agent, or Firm* — RatnerPrestia

(57) ABSTRACT

There is provided a laser processing system including: a robot; a laser emission section provided on the robot; an irradiation path calculation section configured to calculate an irradiation path of a laser beam emitted from the laser emission section using information on a position of the robot; a determination section configured to determine whether the irradiation path calculated passes through an allowable irradiation region that is predetermined; and a laser-output reduction section configured to reduce output of the laser beam to be emitted to the irradiation path to a second output lower than a first output for processing in accordance with a determination by the determination section that the irradiation path does not pass through the allowable irradiation region.

7 Claims, 6 Drawing Sheets

LASER PROCESSING SYSTEM

CROSS-REFERENCE TO RELATED APPLICATIONS

This application is a new U.S. Patent Application that claims benefit of Japanese Patent Application No. 2018-122968, filed Jun. 28, 2018, and Japanese Patent Application No. 2019-083080, filed Apr. 24, 2019, the disclosures of these applications are being incorporated herein by reference in their entirety for all purposes.

BACKGROUND OF THE INVENTION

1. Field of the Invention

The present invention relates to a laser processing system.

2. Description of the Related Art

There is known a laser processing system in which a laser device and a galvano scanner are mounted on a leading end of a robot arm (e.g., refer to JP 2018-39039 A). JP 2018-39039 A discloses the following, "a command correction value is calculated on the basis of the acceleration of vibration acquired by an acceleration sensor provided at a leading end of a robot arm to suppress the displacement of a laser irradiation position due to the vibration, and a control command created by a galvano scanner control section to be transmitted to a galvano motor is corrected using the command correction value" (the paragraph [0026]).

SUMMARY OF THE INVENTION

While the laser processing system as disclosed in JP 2018-39039 A comes into widespread adoption, it is desirable that the laser processing system is configured in further consideration of safety to prevent an unintended region from being irradiated with a laser due to unexpected operation or the like of a robot or the like.

An aspect of the present disclosure is a laser processing system including: a robot; a laser emission section provided on the robot; an irradiation path calculation section configured to calculate an irradiation path of a laser beam emitted from the laser emission section using information on a position of the robot; a determination section configured to determine whether the irradiation path calculated passes through an allowable irradiation region that is predetermined; and a laser-output reduction section configured to reduce the output of the laser beam to be emitted to the irradiation path to a second output lower than a first output for processing in accordance with a determination by the determination section that the irradiation path does not pass through the allowable irradiation region.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
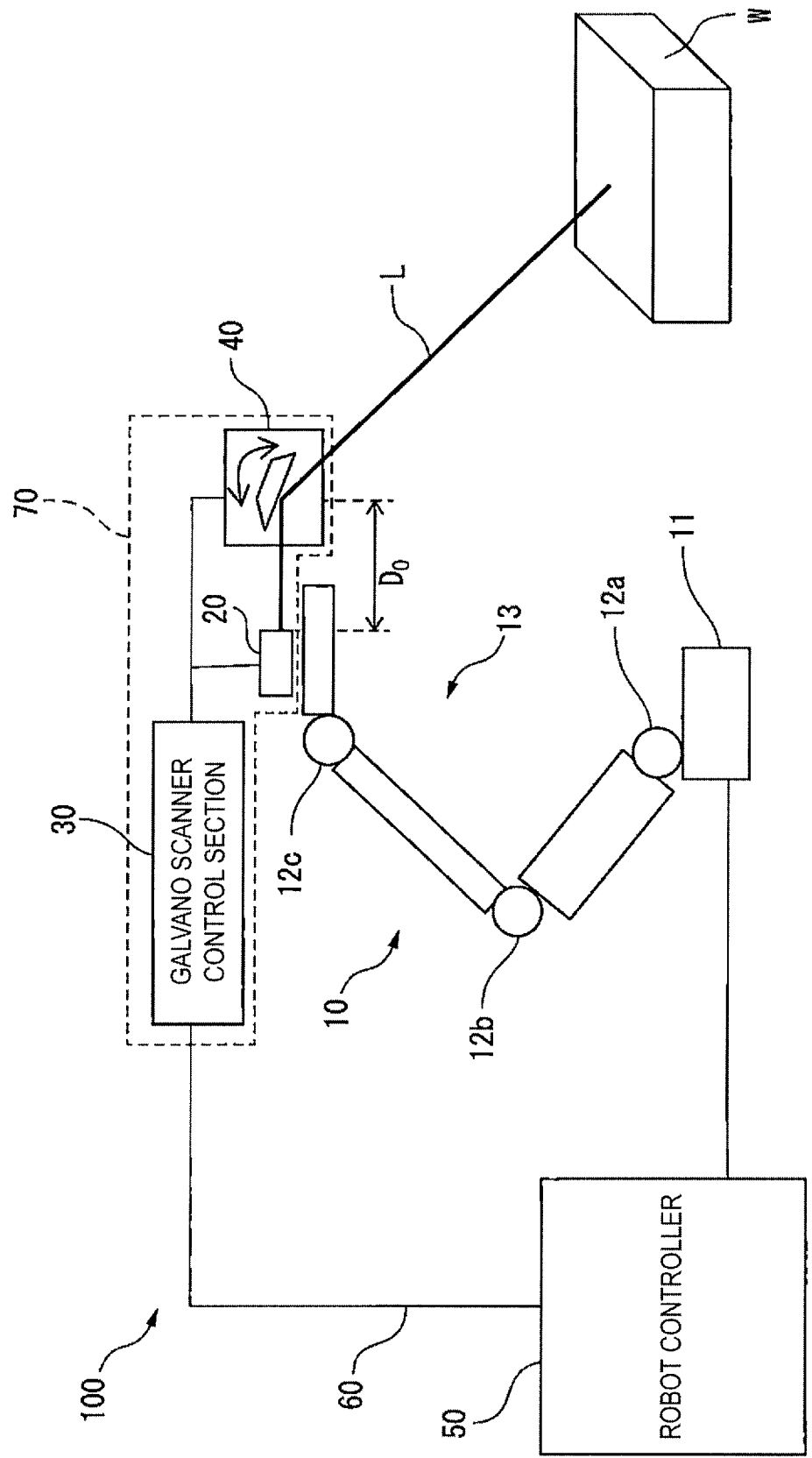
FIG. 1 is a block diagram illustrating an overall configuration of a laser processing system according to an embodiment.

Embodiments of the present invention will be described below with reference to the accompanying drawings. Throughout the drawings, corresponding components are denoted by common reference numerals. To make it easy to understand the drawings, scales of the drawings are appropriately changed. Note that modes illustrated in the drawings are merely examples to implement the invention, and the invention is not limited to the modes illustrated.

FIG. 1 is a block diagram illustrating an overall configuration of a laser processing system 100 according to an embodiment. As illustrated in FIG. 1, the laser processing system 100 includes a robot 10, a robot controller 50 configure to control the robot 10, and a laser emission section 70 disposed at a leading end of an arm 13 of the robot 10. The laser emission section 70 of the present embodiment includes a laser device 20 and a galvano scanner 40, mounted at the leading end of the arm 13; and a galvano scanner control section 30 configured to drive and control the laser device 20 and the galvano scanner 40. The robot 10 is a vertical multiaxis robot, for example. The robot controller 50 and the galvano scanner control section 30 are connected to each other via a network 60. The galvano scanner 40 is, for example, a galvano scanner of a biaxial type of causing a laser beam L to scan in a two-dimensional direction, and includes motors corresponding to the respective biaxial directions and galvano mirrors mounted to axes of the respective motors. The galvano scanner control section 30 synchronously controls the motors for the respective biaxial directions of the galvano scanner 40 according to operation commands written in a scanner operation program to perform two-dimensional scan operation with the laser beam L. The galvano scanner 40 is not limited to a biaxial type, and a uniaxial type or a triaxial type may be used. The galvano scanner control section 30 also has a function of controlling the laser device 20 (ON-OFF control of the laser device 20, a function of adjusting output, etc.). The laser processing system 100 emits the laser beam L while the robot 10 transports the laser emission section 70, thus performing laser processing (welding, etc.) of a workpiece W such as a body of an automobile.

The robot 10 includes a base 11, the arm 13, a plurality of axes 12a to 12c, and servo motors for driving the respective axes (not illustrated). The robot controller 50 controls the robot 10 according to operation commands written in a robot operation program stored in a storage device of the robot controller 50. The robot controller 50 is capable of grasping a position of the robot 10 (e.g., a position of the leading end of the arm 13) on the basis of structural information (an arm length, etc.) on the robot 10 and current positional information from a pulse coder (position-speed detector) provided in each of the servo motors provided in the respective axes at opposite ends of the arm, for example. The robot controller 50 also has information indicating a shape and a position of the workpiece W. The laser device 20 is one of the various laser beam sources each including a laser medium, an optical resonator, an excitation source, and the like. The robot controller 50 may be a typical computer including a CPU, a ROM, a RAM, a storage device, a display, an input-output device, and the like.

Figure 2:
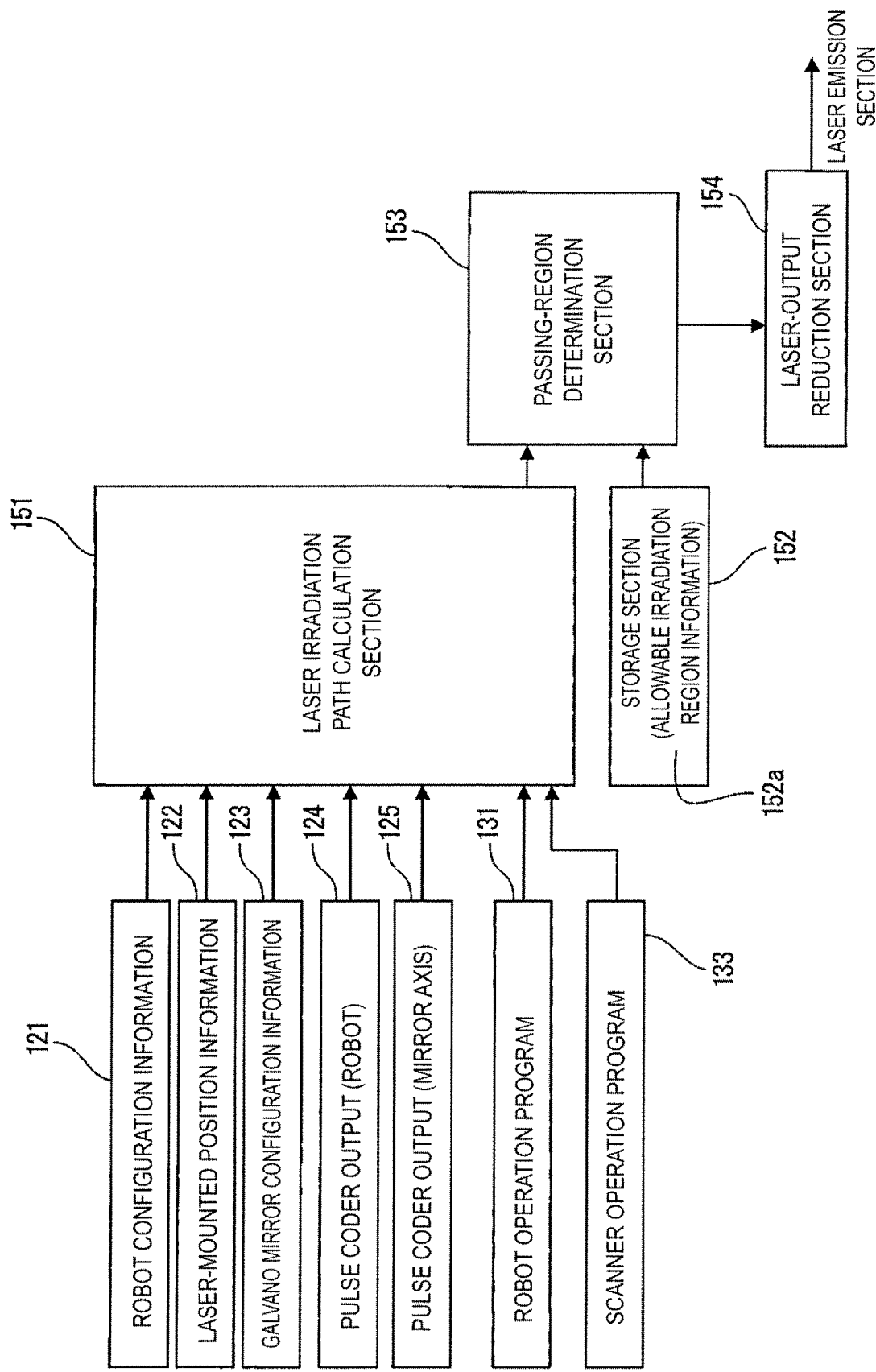
FIG. 2 is a functional block diagram illustrating functions configured in a robot controller.

The laser processing system 100 with the configuration described above has a function of preventing the outside of a predetermined allowable irradiation region from being irradiated with the laser beam L by calculating an irradiation path of the laser beam L emitted from the galvano scanner 40 toward the workpiece W. FIG. 2 is a functional block diagram illustrating functions configured in the robot controller 50 to achieve a suppression function of a laser beam, as described above. The functional block diagram illustrated in FIG. 2 is achieved by the CPU, the storage device, and the like in the robot controller 50, for example.

A laser irradiation path calculation section 151 has two calculation methods each for calculating the irradiation path of the laser beam L emitted from the galvano scanner 40 toward the workpiece W. The two calculation methods will be described below.

(First Calculation Method)

A first calculation method is a method for calculating the irradiation path of the laser beam L using a current position of the robot 10, a current position of the galvano scanner 40, and the like. The laser irradiation path calculation section 151 receives robot configuration information 121, laser-mounted position information 122, galvano mirror configuration information 123, output from the pulse coder of each axis of the robot 10 (pulse coder output (robot)) 124), and output from a pulse coder of a drive axis of each mirror of the galvano scanner 40 (pulse coder output (mirror axis) 125).

The robot configuration information 121 is configuration information of the robot 10 that includes the number of axes of the robot 10, a length of each arm, a reduction gear ratio of each reduction gear, and the like and is possessed in advance by the robot controller 50. The laser-mounted position information 122 includes information indicating a mounted position of the laser device 20 and is possessed in advance by the robot controller 50. The laser-mounted position information 122 allows a mounted position of the laser device 20 in a coordinate system with reference to an installation position of the robot 10 (referred to below as a robot coordinate system) to be grasped. The galvano mirror configuration information 123 is the configuration information of the galvano mirror that includes the number of drive axes, placement, and the like of the galvano mirrors in the galvano scanner 40. The galvano mirror configuration information 123 also includes a distance $D_0$ between the laser device 20 and the galvano scanner 40. The galvano mirror configuration information 123 is provided to the laser irradiation path calculation section 151 from the galvano scanner control section 30. The pulse coder output (robot) 124 includes current positional information from the pulse coder (position-speed detector) provided in the servo motor of each axis of the robot 10. The pulse coder output (mirror axis) 125 includes current positional information from the pulse coder (position-speed detector) provided in the motor of the drive axis of each mirror of the galvano scanner 40. The pulse coder output (mirror axis) 125 is provided to the laser irradiation path calculation section 151 from the galvano scanner 40 via the galvano scanner control section 30.

The laser irradiation path calculation section 151 calculates a current position of the robot 10 (e.g., a position of the leading end of the arm 13 in the robot coordinate system) using the robot configuration information 121 and the pulse coder output (robot) 124. The laser irradiation path calculation section 151 acquires a mounted position of the laser device 20 in the robot coordinate system using the laser-mounted position information 122. The laser irradiation path calculation section 151 also acquires a current position of scan operation using the galvano mirror configuration information 123 and the pulse coder output (mirror axis) 125. The laser irradiation path calculation section 151 is capable of grasping the irradiation path of the laser beam L (e.g., an irradiation start point and an irradiation direction) in the robot coordinate system using the information described above.

Figure 3:
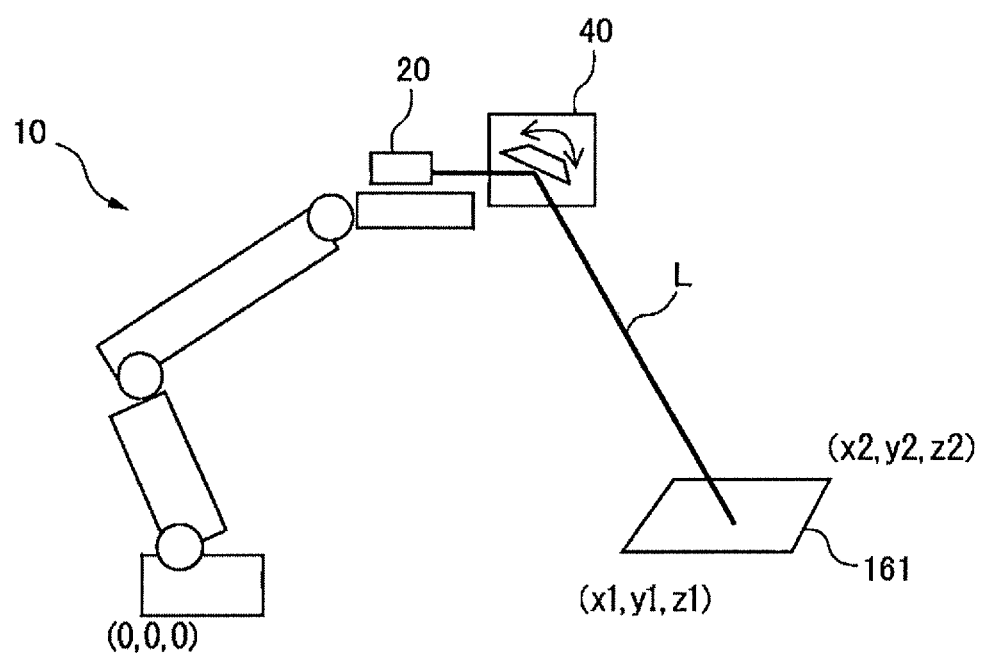
FIG. 3 is a diagram illustrating an example of an allowable irradiation region indicated by information on the allowable irradiation region.

A storage section 152 stores allowable irradiation region information 152a that includes information regarding a region on a surface of the workpiece W that allows the laser beam L to pass therethrough. FIG. 3 illustrates an example of an allowable irradiation region 161 in a quadrangular shape indicated by the allowable irradiation region information 152a. When the allowable irradiation region 161 is a quadrangular region as illustrated in FIG. 3, the allowable irradiation region information 152a may include coordinates (x1, y1, z1) and (x2, y2, z2) of diagonal positions in the allowable irradiation region 161 in the robot coordinate system. When the allowable irradiation region is in the shape of a polygon, the allowable irradiation region information may include a coordinate of each vertex of the polygon. When the allowable irradiation region is in the shape of a circle, the allowable irradiation region information may include a coordinate of the center of the circle and a radius thereof. For example, as the allowable irradiation region 161, there may be set a region that includes processing points and that is considered not to particularly cause a problem of safety even when the laser beam passes through the region.

Figure 4:
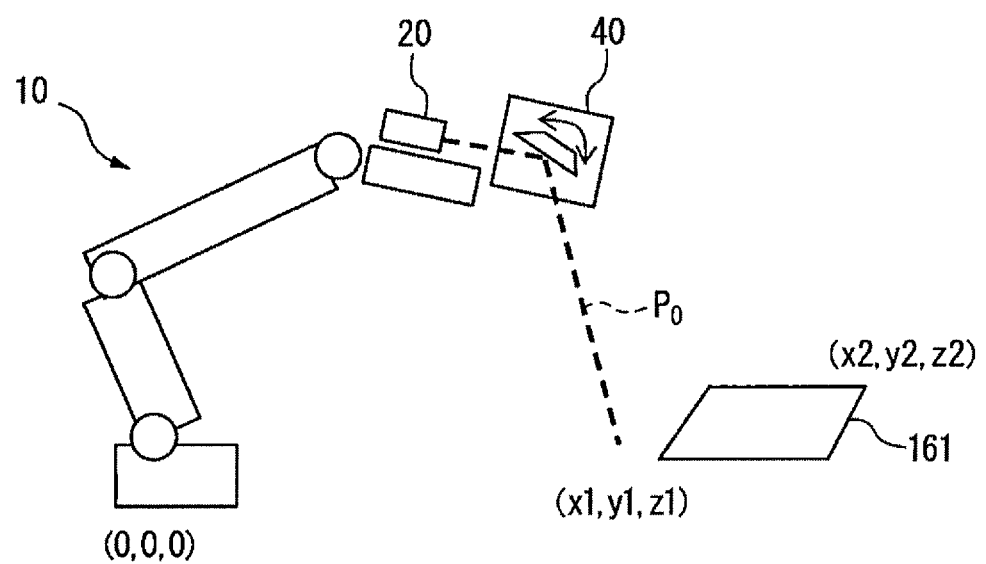
FIG. 4 is a diagram illustrating a state where irradiation with a laser beam is stopped in accordance with a determination that a calculated irradiation path of a laser beam passes through outside the allowable irradiation region.

A passing-region determination section 153 determines whether the laser beam L passes through the allowable irradiation region 161 on the basis of the irradiation path of the laser beam L provided by the laser irradiation path calculation section 151 and the allowable irradiation region information 152a stored in the storage section 152. When determining that the laser beam L is out of the allowable irradiation region 161, the passing-region determination section 153 outputs a signal to a laser-output reduction section 154 to reduce laser output of the laser device 20. For example, in accordance with a determination that the laser beam L is out of the allowable irradiation region 161, the laser-output reduction section 154 reduces laser output of the laser device 20 to a level with no problem of safety from an output level of processing (or stops the laser output). FIG. 4 illustrates a state where irradiation with a laser beam is stopped in accordance with a determination that a calculated irradiation path $P_0$ of a laser beam passes through outside the allowable irradiation region 161. When the irradiation with a laser beam is stopped, the operation of the robot 10 may be also stopped.

According to the first calculation method described above, a current position of the robot 10 and a current position of scan operation of the galvano scanner 40 are actually measured to grasp the irradiation path of the laser beam L, so that the outside of the allowable irradiation region can be reliably prevented from being irradiated with the laser beam L when the robot 10 is unintentionally operated or is in an unpredictable state, for example.

(Second Calculation Method)

A second calculation method is a method for calculating the irradiation path of the laser beam L by reading in advance a robot operation program 131 and a scanner operation program 133 of a galvano scanner. As illustrated in FIG. 2, the laser irradiation path calculation section 151 acquires the robot operation program 131 possessed by the robot controller 50. This allows the laser irradiation path calculation section 151 to grasp a position of the robot 10 at time ahead of the current time from an operation command written in the robot operation program 131. The laser irradiation path calculation section 151 also acquires the scanner operation program 133 possessed by the galvano scanner control section 30. The laser irradiation path calculation section 151 obtains a position of the scan operation of the galvano scanner 40 at time ahead of the current time from an operation command written in the scanner operation program 133 acquired. When these kinds of information are used together with the robot configuration information 121, the laser-mounted position information 122, and the galvano mirror configuration information 123, the laser irradiation path calculation section 151 can calculate an irradiation path of the laser beam L at time ahead of the current time.

As with the first calculation method described above, the passing-region determination section 153 determines whether the laser beam L passes through the allowable irradiation region 161 on the basis of the irradiation path of the laser beam L calculated with the second calculation method and the allowable irradiation region information 152a stored in the storage section 152. When determining that the laser beam L is out of the allowable irradiation region 161, the passing-region determination section 153 outputs a signal to the laser-output reduction section 154 to reduce laser output of the laser device 20. For example, in accordance with a determination that the laser beam L is out of the allowable irradiation region 161, the laser-output reduction section 154 stops the laser output of the laser device 20 or reduces it to a level with no problem of safety.

According to the second calculation method described above, when it is found that the laser beam L passes through outside the allowable irradiation region by reading in advance the robot operation program 131 and the like to grasp an irradiation path at time ahead of the current time, irradiation with the laser beam L can be stopped, for example. When a robot is introduced at a production site, it is assumed that teaching points are corrected at the site. In a situation where teaching points are corrected at the site as describe above, it is difficult in many cases to verify operation by simulation. On this point, according to the second calculation method described above, even when there is an error in correcting teaching points at the site, the laser beam can be reliably prevented from passing through outside the allowable irradiation region.

Figure 5:
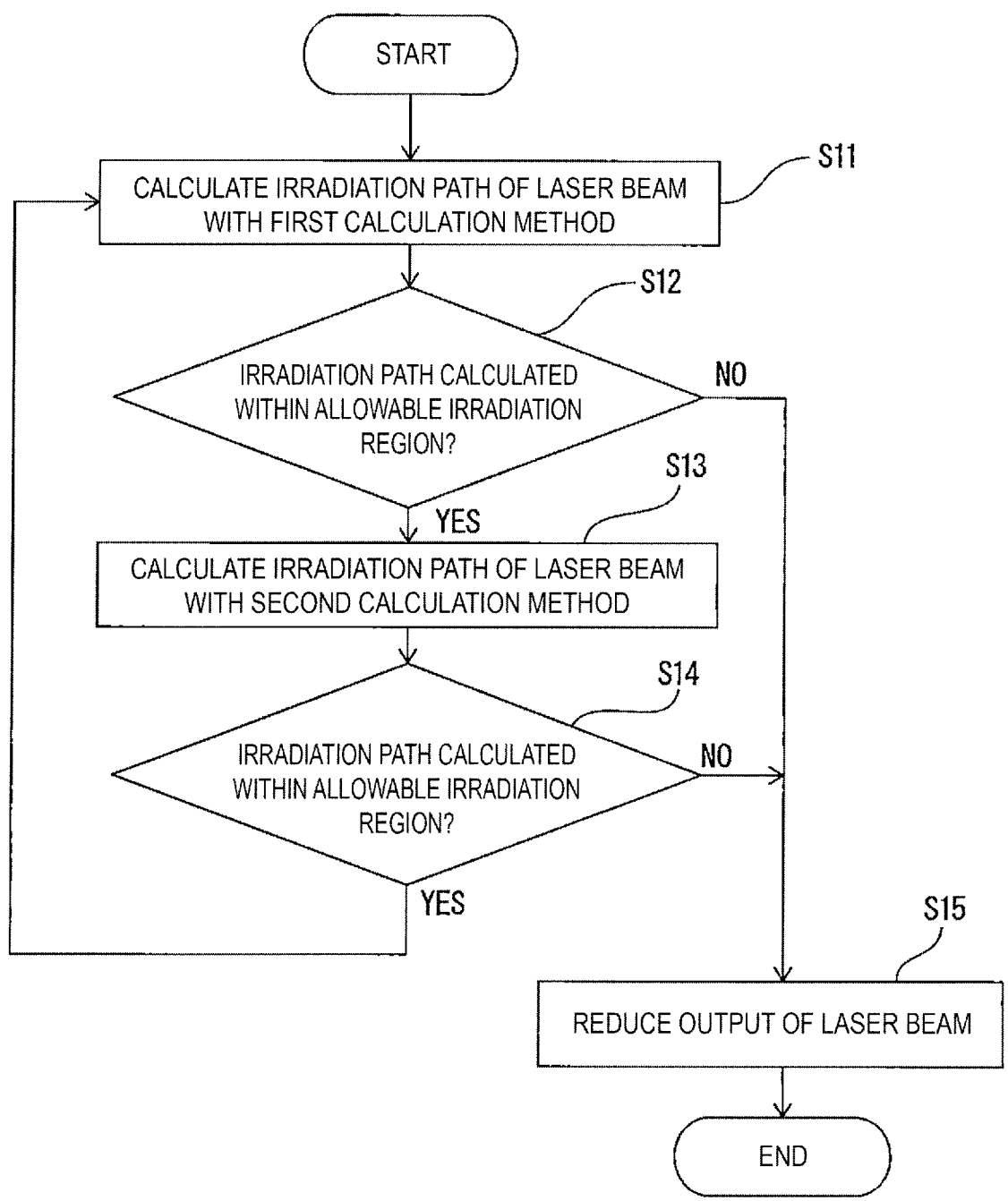
FIG. 5 is a flowchart illustrating a process of determining an irradiation path and reducing laser beam output.

The laser irradiation path calculation section 151 may calculate an irradiation path with both the first calculation method and the second calculation method to provide calculation results to the passing-region determination section 153. In this case, when an irradiation path calculated with one of the first calculation method and the second calculation method is out of the allowable irradiation region, irradiation with the laser beam can be stopped, for example. FIG. 5 is a flowchart illustrating the operation in this case. Processing of FIG. 5 is performed in parallel with processing operation of the robot 10, under control of a CPU of the robot controller 50. First, an irradiation path of a laser beam is calculated with the first calculation method described above (step S11). Next, it is determined whether the irradiation path calculated with the first calculation method is within an allowable irradiation region (step S12). In accordance with a determination that the irradiation path of the laser beam is out of the allowable irradiation region (S12: NO), output of the laser beam is reduced (stopped, etc.) (step S15).

At step S12, in accordance with a determination that the irradiation path of the laser beam is within the allowable irradiation region (S12: YES), the process proceeds to step S13, and then the irradiation path of the laser beam is calculated with the second calculation method described above (step S13). Next, at step S14, it is determined whether the irradiation path calculated with the second calculation method is within the allowable irradiation region. In accordance with a determination that the irradiation path of the laser beam is out of the allowable irradiation region (S14: NO), the output of the laser beam is reduced (stopped, etc.) (step S15). At step 14, in accordance with a determination that the irradiation path of the laser beam is within the allowable irradiation region (S14: YES), the process returns to step S11.

As a modification of the operation of FIG. 5 described above, calculation and determination of an irradiation path with the second calculation method (steps S13 and S14) may be performed once when the robot operation program 131 is corrected. The laser irradiation path calculation section 151 may calculate an irradiation path with one of the first calculation method and the second calculation method to provide a calculation result to the passing-region determination section 153.

As described above, according to the present embodiment, an unintended region can be reliably prevented from being irradiated with a laser due to unexpected operation or the like of a robot or the like. Even when verification of a robot operation program or the like in a simulation stage does not have a high accuracy, an unintended region can be prevented from being irradiated with a laser.

While the invention has been described with reference to specific embodiments, it will be understood, by those skilled in the art, that various changes or modifications may be made thereto without departing from the scope of the claims described later.

In the embodiment above, the laser irradiation path calculation section 151, the storage section (allowable irradiation region information) 152 and the passing-region determination section 153 are provided in the robot controller 50; however, these functions may be implemented on a computer (hereafter, referred to as a passing-region determination computer) connected to the robot controller 50 via a network. In this configuration, the robot controller 50 is configured to transmit, to the passing-region determination computer, various types of information (e.g., the pulse coder output (robot) 124) for calculating an irradiation path of a laser beam. The above described configuration provides an advantage that, in a system where a plurality of robots are connected to a passing-region determination computer, it is unnecessary to install, on each of the robots (the robot controllers), the functions (software) attained by the laser irradiation path calculation section 151, the storage section (allowable irradiation region information) 152 and the passing-region determination section 153. Let us consider a system in which a plurality of robots are connected to a passing-region determination computer via a network, and an output of one laser oscillator is switched by a selector device which is capable of switching an output destination so as to supply the laser beam to one of the robots respectively having laser emission sections. In this system, the selector device can be controlled via the network from the passing-region determination computer. In this system, switching operation of the selector device is controlled so that a laser beam is not supplied to a robot of which the irradiation path of a laser beam is determined to be NG (i.e., out of the allowable irradiation region). According to the above described configuration, when one robot fails, an operation of stopping supply of the laser beam to the failed robot while continuing supply of the laser beam to the other normal robots can be achieved with such a simple manner as to control the selector device from the passing-region determination computer.

The configuration of the laser processing system described in the embodiment above is an example, and the present invention can be applied to various laser processing systems. For example, while the embodiment above is a configuration example in the case where the laser emission section 70 includes the galvano scanner 40, it is needless to say that the present invention can be also applied to the case where the laser emission section 70 does not include the galvano scanner 40. In this case, the laser irradiation path calculation section 151 can calculate an irradiation path of a laser beam using the robot configuration information 121, the laser-mounted position information 122, and the pulse coder output (robot) 124.

In addition, the present invention can be applied to a laser processing system of a type that introduces a laser beam to a laser emission section at a leading end of a robot arm from a laser device separated from the robot 10 using an optical fiber.

While, in the configuration example of the laser processing system illustrated in FIG. 1, the galvano scanner control section configure to control the galvano scanner 40 and the robot controller 50 configure to control the robot 10 are separately provided, the galvano scanner 40 and the robot 10 may be configured to be controlled by one control device.

While, in the configuration example of the laser processing system illustrated in FIG. 1, only one allowable irradiation region is set, a plurality of allowable irradiation regions may be set. In this case, a reduction value of laser output when an irradiation path is out of the regions may be set to a value different in each region. For example, when an irradiation path is out of a first allowable irradiation region, output of a laser beam may be reduced to a level with no problem of safety, and when the irradiation path is out of a second allowable irradiation region, the output of the laser beam may be stopped.

Figure 6:
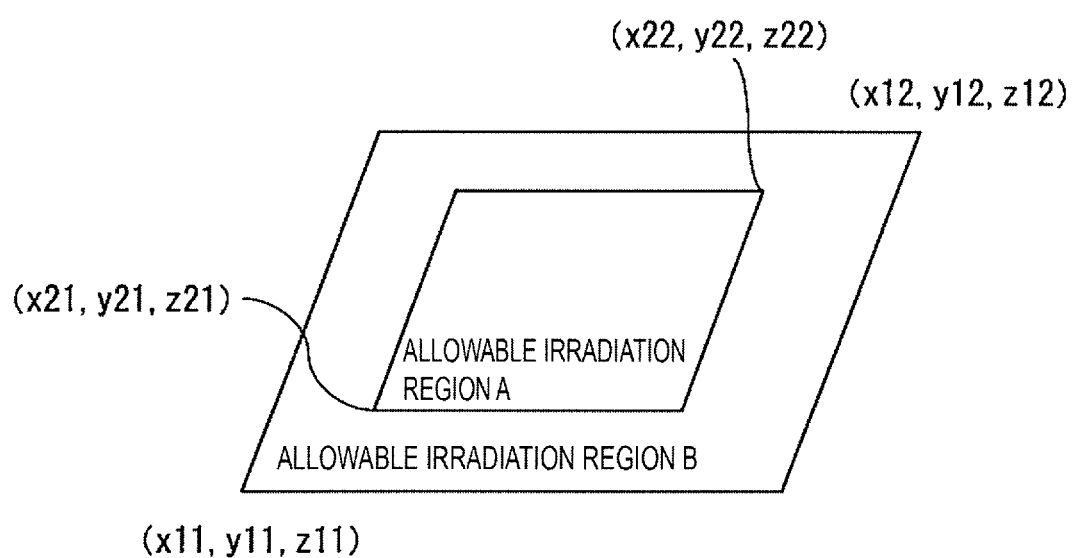
FIG. 6 is a diagram illustrating an example in which an allowable irradiation region is formed of two regions.

Alternatively, as illustrated in FIG. 6, an allowable irradiation region may be formed of an allowable irradiation region A and an allowable irradiation region B including the allowable irradiation region A thereinside. In the example of FIG. 6, the allowable irradiation regions A and B are each a rectangular region. The allowable irradiation region A has diagonal position coordinates (x21, y21, z21) and (x22, y22, z22), and the allowable irradiation region B has diagonal position coordinates (x11, y11, z11) and (x12, y12, z12). In this case, the following operation can be achieved.

(1) When an irradiation region with a laser beam is out of the allowable irradiation region A and is within the allowable irradiation region B, output of the laser beam is reduced to a level with no problem of safety, and when the irradiation path is returned to the allowable irradiation region A, irradiation with the laser beam at the output for processing is immediately resumed.

(2) When an irradiation region with a laser beam is out of the allowable irradiation region B, output of the laser beam is stopped.

In order to solve the issues in the present disclosure, various aspects and their effects can be supplied as described below. Note that, numbers in parentheses in the description of the following aspects correspond to reference signs of the drawings in the present disclosure.

For example, a first aspect of the present disclosure is a laser processing system (100) including: a robot (10); a laser emission section (70) provided on the robot (10); an irradiation path calculation section (151) configured to calculate an irradiation path of a laser beam emitted from the laser emission section (70) using information on a position of the robot (10); a determination section (153) configured to determine whether the irradiation path calculated passes through an allowable irradiation region that is predetermined; and a laser-output reduction section (154) configured to reduce output of the laser beam to be emitted to the irradiation path to a second output lower than a first output for processing in accordance with a determination by the determination section (153) that the irradiation path does not pass through the allowable irradiation region.

According to the first aspect described above, an unintended region can be reliably prevented from being irradiated with a laser due to unexpected operation or the like of a robot or the like.

A second aspect of the present disclosure is the laser processing system (100) of the first aspect described above, wherein the laser emission section (70) includes a scanner (40) configured to perform scan operation, and the irradiation path calculation section (151) calculates the irradiation path further using information on a position of the scan operation of the scanner (40).

A third aspect of the present disclosure is the laser processing system (100) of the second aspect described above, wherein the scanner (40) includes a mirror configured to perform the scan operation and a motor configured to drive the mirror, and the information on the position of the scan operation includes information on a current position of the motor.

A fourth aspect of the present disclosure is the laser processing system (100) of any one of the first to third aspects described above, wherein the robot (10) is a multi-axis robot, and information on the position of the robot (10) includes information on a length of an arm between axes of the multiaxis robot and a current position of a motor provided in each of axes at opposite ends of the arm.

A fifth aspect of the present disclosure is the laser processing system (100) of any one of the first to third aspects described above, wherein the information on the position of the robot (10) includes a command written in a robot operation program.

A sixth aspect of the present disclosure is the laser processing system (100) of the second aspect described above, wherein the information on the position of the scan operation includes a command written in a scanner operation program.

A seventh aspect of the present disclosure is the laser processing system (100) of any one of the first to sixth aspects described above, wherein the laser-output reduction section (154) sets the second output to zero.

An eighth aspect of the present disclosure is the laser processing system (100) of any one of the first to seventh aspects described above, wherein the allowable irradiation region is formed of a plurality of regions, the second output is set to be associated with each of the plurality of regions so as to have values different from each other between the plurality of regions, the determination section (153) determines whether the irradiation path passes through each of the plurality of regions, and in accordance with a determination by the determination section (153) that the irradiation path does not pass through one of the plurality of regions, the laser-output reduction section (154) sets the second output to a value set in association with the one of the plurality of regions determined.

The invention claimed is:

1. A laser processing system comprising:
   a robot;
   a laser emission section provided on the robot;
   an irradiation path calculation section configured to calculate an irradiation path of a laser beam emitted from the laser emission section using information on a position of the robot;
   a determination section configured to determine whether the irradiation path calculated passes through an allowable irradiation region that is predetermined; and
   a laser-output reduction section configured to reduce output of the laser beam to be emitted to the irradiation path to a second output lower than a first output for processing in accordance with a determination by the determination section that the irradiation path does not pass through the allowable irradiation region,
   wherein:
      the allowable irradiation region is formed of a plurality of at least partially overlapping regions,
      the second output is set to be associated with each of the plurality of at least partially overlapping regions so as to have values different from each other between the plurality of at least partially overlapping regions,
      the determination section determines whether the irradiation path passes through each of the plurality of at least partially overlapping regions, and
      in accordance with a determination by the determination section that the irradiation path does not pass through one of the plurality of at least partially overlapping regions, the laser-output reduction section sets the second output to a value set in association with the one of the plurality of at least partially overlapping regions determined.

2. The laser processing system according to claim 1, wherein
   the laser emission section includes a scanner configured to perform scan operation, and
   the irradiation path calculation section calculates the irradiation path further using information on a position of the scan operation of the scanner.

3. The laser processing system according to claim 2, wherein
   the scanner includes a mirror configured to perform the scan operation and a motor configured to drive the mirror, and
   the information on the position of the scan operation includes information on a current position of the motor.

4. The laser processing system according to claim 1, wherein
   the robot is a multiaxis robot, and
   the information on the position of the robot includes information on a length of an arm between axes of the multiaxis robot and a current position of a motor provided in each of axes at opposite ends of the arm.

5. The laser processing system according to claim 1, wherein
   the information on the position of the robot includes a command written in a robot operation program.

6. The laser processing system according to claim 2, wherein
   the information on the position of the scan operation includes a command written in a scanner operation program.

7. The laser processing system according to claim 1, wherein
   the laser-output reduction section sets the second output to zero.

* * * * *